United States Patent [19]
Seibel et al.

[11] Patent Number: 6,014,007
[45] Date of Patent: Jan. 11, 2000

[54] METHOD AND APPARATUS FOR STARTING AN AC DRIVE INTO A ROTATING MOTOR

[75] Inventors: Brian J. Seibel, Grafton; Timothy M. Rowan, Wauwatosa; Russel J. Kerkman, Milwaukee, all of Wis.

[73] Assignee: Allen-Bradley Company LLC, Milwaukee, Wis.

[21] Appl. No.: 09/163,107

[22] Filed: Sep. 29, 1998

[51] Int. Cl.[7] .................................................. H02P 5/28
[52] U.S. Cl. .......................... 318/805; 318/804; 318/808; 318/809; 318/807; 318/798; 318/810; 318/801; 318/812
[58] Field of Search ..................... 318/805, 804, 318/808, 809, 807, 798, 810, 801, 812

[56] References Cited

U.S. PATENT DOCUMENTS

| | | | |
|---|---|---|---|
| 5,448,150 | 9/1995 | Yamamoto et al. | 318/805 |
| 5,510,689 | 4/1996 | Lipo et al. | 318/809 |
| 5,668,459 | 9/1997 | Kim | 318/798 |
| 5,798,628 | 8/1998 | Fujita et al. | 318/805 |
| 5,811,956 | 9/1998 | Yamamoto | 318/801 |

Primary Examiner—Karen Masih
Attorney, Agent, or Firm—Michael A. Jaskolski; John M. Miller; John J. Horn

[57] ABSTRACT

A method and apparatus for starting a motor drive into a rotating motor, the method including determining an initial search frequency and search current wherein the current is less than a rated drive current, providing a d-axis flux generating current to the motor at the search frequency and at a magnitude equal to the search current, monitoring a q-axis flux error, decreasing the search frequency until the d-axis flux error is less than a threshold value, thereafter increasing the search current to the rated drive current and, after a flux-up period, providing both q-axis torque producing current and d-axis flux producing current to the motor.

22 Claims, 8 Drawing Sheets

METHOD AND APPARATUS FOR STARTING AN AC DRIVE INTO A ROTATING MOTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motor drives for variable speed control of AC induction motors and more particularly to a method and apparatus for smoothly starting an AC motor drive into a rotating motor.

Induction Motors Induction motors have broad application in industry, particularly when large horsepower is needed. A typical induction motor includes a stator and a rotor. The stator includes a three phase stator winding which forms a cylindrical stator cavity. A common rotor design includes a "squirrel cage winding" in which axial conductive bars are connected at either end by shorting rings to form a generally cylindrical structure. The rotor is concentrically mounted for rotation within the stator cavity.

The rotor is forced to rotate within the stator cavity by providing three phase electrical voltages to the stator windings. The stator voltages generate stator currents which in turn cause a rotating magnetic stator field. The stator field interacts with the rotor to cause rotation.

As with movement of any object, rotor movement requires both (1) interaction between the stator field and the rotor and (2) a force applied to the rotor. Without enough interaction, even an extremely large force cannot move a rotor. Similarly, without enough force, even mechanical contact could not move a rotor.

The interaction required for rotor movement is provided as follows. As the stator field rotates about the cavity, stator field flux lines cut across rotor bars. If the stator field rotates at a speed which is slightly greater than a rotor speed so that each bar is subjected to a slowly varying stator field, the stator flux induces rotor bar currents (hence the term "induction" motor). The term "slip" will be used hereinafter to refer to the difference between the stator field and rotor frequencies.

The rotor currents cause a magnetic rotor flux field. Rotor field strength is related to the number of stator flux lines cut by the rotor bars and therefore the amounts of rotor and stator flux are both related to stator field strength. The stator and rotor fields attract and hence provide the interaction required for rotor movement. Thus, the stator field has an "attraction" component which provides the interaction required for rotor movement. Because the stator field attraction component causes flux which interacts with the rotor, the attraction component is referred to hereinafter as the "flux producing" component.

The force required for rotor movement is provided as follows. As the stator field rotates about the cavity, if stator and rotor field attraction is sufficient, the stator field "pulls" the rotor along thereby causing rotation. Thus, in addition to the flux producing component, the stator field has a "shear force" component pushing tangent to the rotor surface tending to rotate the rotor. Because the shear force causes a rotating torque on the rotor, the shear force is referred to hereinafter as the "torque producing" component.

Field Oriented Control

The stator field corresponds to a stator magnetomotive force (hereinafter "mmf"). Referring to FIG. 1, a rotating phasor 1 representing an exemplary stator mmf generally has some angle α with respect to a rotor flux represented by phasor 2. Torque is proportional to the magnitudes of phasors 1 and 2 but also is a function of angle α. On one hand, maximum torque (i.e. maximum shear force) and essentially zero rotor flux (i.e. zero attraction) is produced when phasors 1 and 2 are at right angles to each other (e.g., α=90 degrees). On the other hand essentially zero torque and excessive rotor flux is produced if phasors 1 and 2 are aligned (e.g., α=0 degrees). Mmf phasor 1 may therefore be usefully decomposed into a torque producing component 3 perpendicular to rotor flux phasor 2 (and corresponding to the stator field torque producing component described above) and a flux producing component 4 parallel to rotor flux phasor 2 (and corresponding to the stator field flux producing component described above).

Mmf components 3 and 4 are proportional, respectively, to two stator currents $i_{qe}$, a torque producing current, and $i_{de}$, a flux producing current, which may be represented by orthogonal vectors in a two dimensional d-q rotating stator flux frame of reference (synchronous frame of reference) having slowly varying magnitudes.

Accordingly, in induction motor control it is generally desired to control not only applied driving voltage frequency (hence the speed of the rotation of the stator mmf phasor 1) but also applied voltage phase relative to current flow and hence the division of stator winding currents into $i_{qe}$ and $i_{de}$ components. Control strategies that attempt to independently control q and d-axis currents $i_{qe}$ and $i_{de}$ (and hence the balance between attraction and shear force) are generally termed field oriented control strategies ("FOC").

To accomplish FOC the industry has developed field oriented controllers. A typical PWM controller receives a command rotor frequency signal indicating a desired rotor frequency and includes a plurality of feedback loops to provide current and/or voltage feedback signals for control purposes. The processor uses the feedback signals and the command signal to adjust q and d-axis currents $i_{qe}$ and $i_{de}$ thereby causing the rotor to rotate at the commanded rotor frequency.

As indicated above, rotor flux can only be generated if slip is relatively minimal. This is because currents will only be induced in a rotor bar if the bar is subjected to varying stator flux over at least a short threshold time period. If the stator field is rotating at an extremely high frequency relative to the rotor, the stator field cannot cause rotor flux. Similarly, if the stator field is rotating at a much lower frequency than the rotor very little if any rotor flux will be generated. In either case there is essentially no attraction between the stator field and rotor and hence the stator field cannot be used to control rotor rotation.

For this reason, for example, even where a commanded rotor frequency is 30 Hz, if the instantaneous rotor frequency is much different than 30 Hz, say 28 Hz, in order to increase the rotor frequency to 30 Hz, first the stator field must be provided at approximately 28 Hz to "gain control" of the rotor. Thereafter, once flux (i.e. attraction) between the stator field and rotor is established, the stator field frequency can be increased thereby increasing the rotor frequency.

Initially, when a rotor is stationary rotor frequency is known to be zero. In this case it is relatively easy to start a drive into the motor as the initial stator field frequency will be just above zero. As rotor frequency increases toward the commanded frequency, stator field frequency can be controlled to maintain an acceptable slip using standard field oriented control strategies. Thus, FOC strategies can be applied to precisely control rotor frequency during normal operation.

Unfortunately, under certain operating conditions FOC strategies can cause unintended and disruptive motor operation. One important control area wherein FOC strategies have not been extremely successful has been when a motor drive has to be started into an already rotating motor.

In many industries motors are not driven continuously but rather are turned on and off sporadically. For example, in the wood cutting industry motor power is often disconnected during "power down" periods between cutting jobs to save energy and minimize tool wear. After power is cut off, rotor speed decreases and eventually, after some deceleration period, the rotor stops. Ideally deceleration periods are short. However, in reality, often deceleration periods are longer than a desired power down period and the motor driver has to be started into a rotating motor.

As indicated above, to start a drive into a rotating motor stator field frequency has to be essentially identical to the instantaneous rotor frequency. or this reason many motor control systems include hardware such as a tachometer or an encoder for tracking rotor speed. However, many other systems are not equipped with such speed sensing hardware. In any event, such speed sensing hardware increases system costs and therefore should be avoided if possible.

One solution for determining rotor speed prior to starting a driver into a rotating motor is to use residual stator flux to determine rotor speed. In general, when motor power is disconnected and during a first stage of the deceleration period, the motor rotor operates like a generator inducing a stator flux which varies along with the instantaneous motor frequency. Thus, in the example above, if motor frequency is instantaneously at 29 Hz, the stator flux is also at approximately 29 Hz. The flux decays to essentially zero flux as a function of a rotor time constant. Until the flux decays to zero, the flux value can be used by an AC controller to identify instantaneous motor frequency. Unfortunately, after the flux decays to zero, motor frequency cannot be identified by sensing a residual signal.

A second solution for starting a drive into a rotating motor is described in U.S. Pat. No. 4,958,117 entitled "Frequency Control Based On Sensing Voltage Fed To An Induction Motor" which issued to Kerkman et al. on Sep. 18, 1990. That patent employs a voltage controlled current regulator to start a drive into a rotating motor. That patent reflects the realization that when a voltage controlled current regulator is used to start a drive into a rotating motor where stator field and rotor speed are disparate, the voltage regulator causes excessive command currents. Thus, the command currents can be used to identify instances wherein there is an appreciable difference between the stator field and rotor frequencies.

When excessive command currents occur, a voltage error (i.e. difference between commanded and actual stator winding voltages) is used to modify a command stator field frequency. Once the stator field and rotor speeds are essentially identical the command currents are no longer excessive and volts/hertz control can be used to accelerate the rotor to the commanded frequency. Unfortunately, this scheme does not address FOC.

In general reconnect schemes may be affected by a number of shortcomings. First, as a stator field frequency approaches the rotor frequency a number of different adverse conditions can occur which cause the rotor to jolt or may cause a safety device to trip and cut motor power entirely until the device is reset. For example, one condition is an over current fault wherein, when a voltage is initially provided to a stator winding, the winding resistance is minimal and often the provided voltage is not in phase with any winding potential. In this case a large winding surge current results which can exceed safe levels. Many control systems are equipped with safety devices which cut off motor power when surge currents are sensed to protect system components. Thus, over current faults can cause unintended power cut off resulting in inefficient system operation.

Another condition is referred to as a bus overvoltage fault which occurs with non-regenerative drives (i.e. drives which do not return energy back to a utility supply). A non-regenerative drive typically includes a diode bridge rectifier linked between three utility supply lines and the positive and negative DC rails of a DC bus for converting three AC utility voltages to a DC bus voltage on the rails. A DC bus capacitor is usually provided across the DC rails to help smooth out DC voltage ripple. A PWM inverter then links the DC bus to three motor terminals for providing three phase AC voltage to the terminals for driving the motor.

In a non-regenerating drive power can only flow from the utility to the DC bus and cannot flow in the opposite direction from the bus to the utility. Power also flows from the DC bus to the motor during motoring and, can flow from the motor back to the DC bus during braking (i.e. dynamic slowing of the motor by providing a stator field having a frequency slightly lower than an instantaneous rotor frequency). In a non-regenerative drive if the stator field frequency approaches the rotor speed from below the rotor speed during a frequency search, the motor will operate like a generator just prior to the stator field and rotor frequencies being equal thereby returning energy back to the DC bus and causing excessive DC bus capacitor voltage. Energy returned to the bus can cause voltage across the DC bus capacitor to exceed a safe level and may again trip a safety mechanism cutting off motor power.

Yet another condition referred to as pull out torque can result. During frequency searching the stator field has very little effect on rotor motion as relative motion between the rotor bars and stator flux is too fast to generate rotor currents and flux. However, as the stator field frequency approaches rotor frequency, because field orientation has not yet been achieved, an appreciable amount of the stator mmf causes rotor torque which jolts the rotor instantaneously. This pull out torque has been known to "roll" the rotor thereby hindering frequency identification.

Other conditions include "plugging" and "dynamic braking", terms of art which are well known in the industry and therefore will not be explained here in the interest of simplifying this explanation.

Second, many of the adverse conditions described above are exacerbated by the relatively high search current (i.e. an excessive current level has to be reached prior to frequency modification) employed by this second solution. For example, pull out torque magnitude is a function of the search current magnitude and therefore this second solution causes excessive pull out torque. In addition, excessive current causes higher bus overvoltages and can cause greater plugging and braking forces.

Third, whenever any rotor disturbance occurs during frequency searching the processes of ultimately determining rotor frequency is extended. This is because any disturbance (e.g. a jolt, rolling, etc.) can result in oscillation about the steady state component of rotor frequency and ultimate rotor speed can only be determined after the transient oscillation deteriorates to an essentially zero value. As discussed above there are many sources of disturbances using prior art rotor frequency searching methods.

Thus, it would be advantageous to have a method and/or apparatus which could accurately and quickly determine rotor speed for the purpose of starting a drive into an already rotating motor.

BRIEF SUMMARY OF THE INVENTION

The present invention includes a method for smoothly starting a driver into an already rotating motor. To this end, using a FOC controller, it has been recognized that if the current used to search for a rotor frequency is limited to a d-axis flux producing current component (i.e. the q-axis current is held at a zero value), frequency searching is much smoother and the time required to complete a search is appreciably reduced. By maintaining a zero q-axis torque producing current during a frequency search rotor disturbances are either eliminated or minimized and both current surges and bus overvoltages are minimized. Because disturbances are minimized, less rotor oscillation occurs as the stator field frequency nears rotor frequency resulting in a faster overall speed determination.

In addition, because current surges and overvoltages are minimized it is less likely that a safety device will cut motor power for these reasons resulting in more efficient overall motor operation. After rotor frequency is determined both d and q-axis current components are provided according to conventional FOC strategies to increase rotor frequency to a commanded frequency.

Initially, at the instant when the d-axis stator current is first field oriented with respect to the rotor so that the d-axis current is being provided at essentially the same frequency as the instantaneous rotor frequency, the d-axis current generates only q-axis flux. However, when the d-axis current is not field oriented with respect to the rotor so that the d-axis current is being provided at a frequency which is appreciably different than the rotor frequency, there will be a q-axis flux error. Thus, the q-axis flux error can be used to identify when the stator field frequency is essentially identical to the rotor frequency.

The q-axis flux error can be measured by monitoring a d-axis feedback voltage at the motor terminals and comparing the feedback voltage to a commanded d-axis voltage signal. Where the feedback and commanded d-axis voltage signals are different, a q-axis flux error exists and the stator field frequency is different than the rotor frequency. In this case the stator field frequency (i.e. the d-axis current frequency) must be altered.

The stator field frequency is dynamically altered until the error between the feedback and command d-axis voltages is essentially eliminated (i.e. the q-axis flux error is eliminated) at which point the instantaneous d-axis current frequency is essentially identical to the instantaneous rotor frequency.

After the d-axis stator current frequency and rotor frequency are essentially equal, in one embodiment of the invention motor control is not initiated until after d-axis flux builds up. Because there is no q-axis current, d-axis flux is directly related to q-axis voltage. Therefore, d-axis flux can be monitored by monitoring a q-axis feedback voltage and comparing the q-axis feedback voltage to a voltage level known to occur when d-axis flux is at an acceptable level to start motor operation.

At that point, the FOC controller is allowed to control the motor providing both d and q-axis currents at essentially the rotor frequency to take control of the rotor. The controller eventually increases the stator field frequency thereby increasing the rotor frequency up to the commanded frequency.

In a second embodiment of the invention after the d-axis stator current frequency and rotor frequency are essentially equal both the d and q-axis current components are provided according to conventional FOC strategies to increase rotor frequency to the commanded frequency. It has been recognized that, while this method may be slightly less smooth than the first method (i.e. where flux is first built up prior to FOC), in some applications this method would be advantageous as a faster start time would occur. This is because, as d-axis flux is built up torque can simultaneously be applied to the motor thereby increasing motor speed.

Accordingly, one object of the invention is to provide a method by which a motor controller or driver can be started into an already rotating motor with minimal disturbance. To this end, by providing only d-axis flux generating current, as the stator field frequency approaches the instantaneous rotor frequency, only very little current causes a pull out torque. In reality, some pull out torque still occurs because, during searching the d-axis current is not field oriented with respect to the rotor. For this reason, some of the d-axis current actually acts like a q-axis torque producing current causing some, albeit a minimal amount, of pull out torque as the stator field frequency approaches the rotor frequency.

Another object of the invention is to achieve the aforementioned object with existing controller hardware. Although separate hardware could be provided to implement the present invention, the inventive method is preferably implemented in software run by existing controller hardware and therefore is relatively inexpensive to implement.

Yet one other object of the invention is to identify rotor frequency quickly during a searching procedure. To this end, because only d-axis current is used during the search, current related disturbances are eliminated or their effects are substantially reduced thereby enabling quick frequency identification. In other words, because rotor disturbances are reduced rotor frequency does not oscillate about its steady state frequency component appreciably when the stator field frequency nears the rotor frequency and the steady state rotor frequency can be determined more quickly.

In addition, in this regard, because q-axis flux typically is a much smaller value than d-axis flux, q-axis flux error is eliminated when a d-axis current is provided much faster than a d-axis flux error would be eliminated if a q-axis current was provided. Thus, by using the q-axis flux error instead of a d-axis flux error to determine rotor frequency, the frequency identifying procedure period is minimized.

In a preferred embodiment, during the first stage of the deceleration period after motor power is initially cut off the q-axis feedback voltage which is indicative of residual stator winding flux caused by rotor inductance is monitored. The stator flux, and hence feedback voltage, is at the rotor frequency and therefore can be used to determine the rotor frequency if the stator flux is at least a threshold level. Only after the stator flux falls below the threshold level is the d-axis current provided for frequency searching.

This residual flux tracking feature also speeds up frequency determination as, in some cases where a motor is re-powered shortly after motor power is turned off, rotor speed will be known immediately and the driver can be started into the motor instantaneously.

Also, preferably, when the d-axis current is provided for rotor frequency searching, a relatively low search current is provided. To this end, the search current may be limited to a rated d-axis current or, more preferably, the search current may be limited to a much lower current level (e.g. ⅕th the rated current level). By limiting the search current to a low value the effects of pull out torque and other current related disturbances which are common during frequency searching is minimized even further. For example, referring to FIG. 2, a graph illustrating torque as a function of slip for four different d-axis search current values $i_{de1}$ $i_{de2}$, $i_{de3}$ and $i_{de4}$ is illustrated. Current ide1 is greater than $i_{de2}$, $i_{de2}$ is greater than $i_{de3}$ and $i_{de3}$ is greater than $i_{de4}$. Clearly the pull out torque generated by larger search currents is greater than the pull out torque generated by smaller search currents and therefore smaller search currents are advantageous.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figure 1:
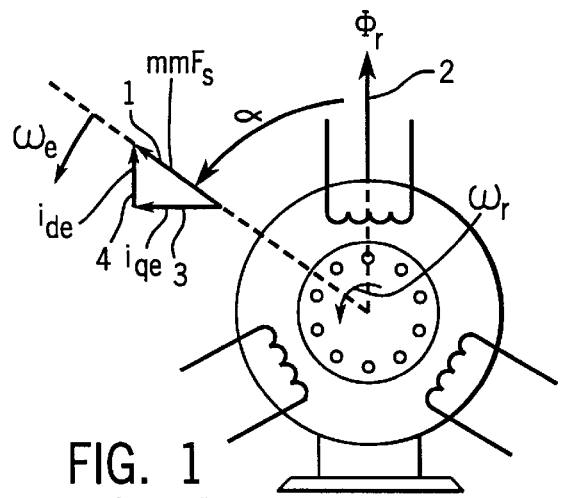
FIG. 1 is a schematic diagram illustrating an exemplary relationship between a stator magnetomotive (mmf) force phasor, a rotor flux phasor and d and q-axis current components of the mmf phasor.
Figure 2:
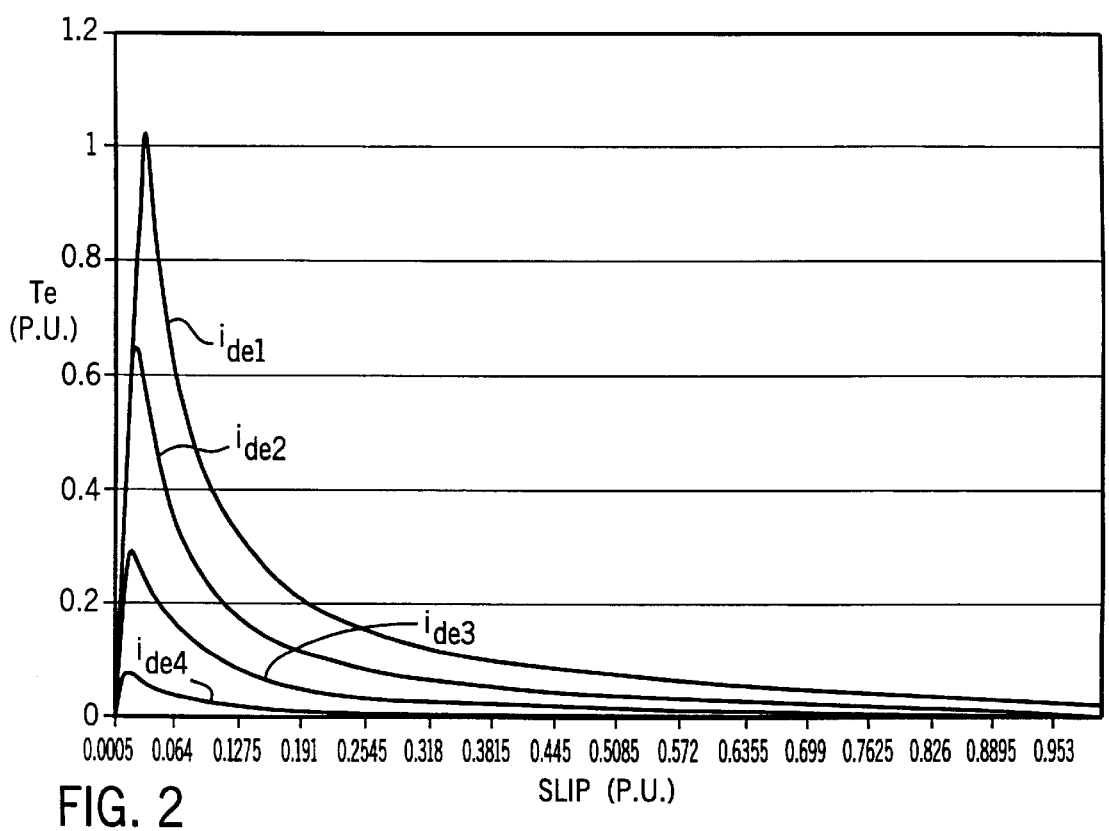
FIG. 2 is a graph illustrating torque as a function of slip for various search current levels which serves to illustrate pull-out torque.

In the description which follows, unless indicated otherwise, an "e" subscript denotes that a signal is referenced to the synchronous frame of reference, an "s" subscript denote that a signal is referenced to the stationary frame of reference, an "f" subscript denotes a feedback signal, an "*" superscript indicates that a signal is a command signal, an "r" subscript denotes that a signal is a rotor signal, a "d" subscript denotes that a signal is referenced to the d-axis in a two dimensional d-q reference frame, a "q" subscript denotes that a signal is referenced to the q-axis in a two dimensional d-q reference frame, and "a", "b" and "c" subscripts indicate that corresponding signals are referenced to "a", "b" and "c" supply lines.

While the following description details various blocks, steps, and functions, it should be remembered that all of these elements are meant to be implemented in software as computer programs and represent algorithms for execution by conventional type digital processor adapted for industrial applications, such as a model 8096 Microelectronic processor as supplied by Intel Corporation of Santa Clara, Calif.

A. Theory

Some basic FOC understanding and system equations are helpful in understanding how the present invention operates to identify rotor frequency. As an initial matter, usually a FOC controller receives a signal indicating command rotor frequency $\omega_r^*$ which is a desired rotor frequency for a controlled motor. For example, the desired frequency may be 30 Hz. The controller uses the command frequency $\omega_r^*$ and a plurality of feedback signals to generate voltages and current to drive the motor at the commanded frequency. To drive the motor rotor, the controller provides a rotating stator field having a stator field frequency $\omega_e$ which is slightly faster than commanded frequency $\omega_r^*$ (i.e. the difference being a slip frequency $\omega_s$). The difference in stator field and rotor frequencies induce rotor bar currents and hence rotor flux required for rotor movement.

To generate the stator field the controller provides both a d-axis command current $i_{de}^*$ for generating "interacting" flux and a q-axis command current $i_{qe}^*$ for generating a torque. As well known in the FOC art, production of any given set of q and d-axis command currents $i_{qe}^*$ and $i_{de}^*$ requires command voltages $V_{qe}^*$ and $V_{de}^*$ as follows:

$$V_{qe}^* = r_s i_{qe}^* + \omega_e \lambda_{de} \quad (1)$$

$$V_{de}^* = r_s i_{de}^* - \omega_e \lambda_{qe} \quad (2)$$

where:

rs=stator resistance;

$\lambda_{de}$=d axis flux linkage; and $\lambda_{qe}$=q-axis flux linkage;

and where:

$r_s i_{de}^*, r_s i_{qe}^*$ = invertor supplied voltages;

and $\omega_e \lambda_{de}, \omega_e \lambda_{qe}$ = counter or back electromotive forces (BEMFs).

Fluxes $\lambda_{de}$ and $\lambda_{qe}$ can be represented as:

$$\lambda_{qe} = L_o i_{qe}^* \quad (3)$$

$$\lambda_{de} = L_m i_{de}^* \quad (4)$$

where:

$L_o$=transient motor inductance; and $L_m$=mutual winding inductance.

To ensure that commanded voltages $V_{de}^*$ and $V_{qe}^*$ are actually provided at motor terminals, most FOC controllers include at least one feedback loop providing d and q-axis feedback voltage signals $V_{def}$ and $V_{qef}$ for comparison to commanded voltages $V_{de}^*$ and $V_{qe}^*$ Any error between voltages $V_{qe}*$ and can cause the controller to modify commanded current $i_{de}*$.

Referring to Equation 2, according to the present invention, when only a d-axis current is commanded the resulting d-axis voltage is $V_{de}*=r_s i_{de}*$. When no q-axis current $i_{qe}*$ is commanded, no q-axis stator flux component $\lambda_{qe}$ is produced when the stator and rotor frequencies are equal. However, when frequency $\omega_e$ is not equal to the rotor frequency, a q-axis flux error occurs which is reflected in an actual d-axis voltage.

A feedback d-axis voltage equation similar to Equation 2 can be written as:

$$V_{def} = r_s i_{de} - \omega_e \lambda_{qef} \qquad (5)$$

where $V_{def}$ is a feedback d-axis voltage indicating actual d-axis voltage. Equations 2 and 5 can be combined to yield:

$$\hat{\lambda}_{qe} = \lambda_{qe} - \lambda_{qef} = (V_{de}^* - V_{def})\frac{1}{\omega_e} \qquad (6)$$

where $\hat{\lambda}_{qe}$ is a q-axis flux error. Hence, the difference $V_{de}*-V_{def}$ can be used to identify flux error $\hat{\lambda}_{qe}$ and thereby recognize a difference between stator field and rotor frequency. Similarly, an equation for d-axis flux error $\lambda_{de}$ can be derived as:

$$\hat{\lambda}_{de} = \lambda_{de} - \lambda_{def} = (V_{qe}^* - V_{qef})\frac{1}{\omega_e} \qquad (6a)$$

Once disparate stator field and rotor frequencies have been identified via flux error $\hat{\lambda}_{qe}$, the d-axis command and feedback voltage signals $V_{de}*$, $V_{def}$, respectively, are used by the controller to adjust stator field frequency either up or down depending upon whether or not the stator field frequency is above or below the rotor frequency.

As well known in the controls art, d-axis feedback voltage $V_{def}$ is generated by first sensing three phase stator terminal voltages $V_{as}$, $V_{bs}$ and $V_{cs}$, converting voltages $V_{as}$, $V_{bs}$ and $V_{cs}$ to two-phase stationary d and q-axis voltages $V_{dsf}$, $V_{qsf}$, respectively, and then converting voltages $V_{dsf}$ and $V_{qsf}$ to synchronous d and q-axis voltages $V_{def}$, $V_{qef}$ as a function of the instantaneous stator winding frequency $\omega_e$. Specifically, frequency $\omega_e$ is converted to a phase angle $\theta_e$ used to identify voltages $V_{qef}$, $V_{def}$ according to the following equation:

$$\begin{bmatrix} V_{qef} \\ V_{def} \end{bmatrix} = \begin{bmatrix} \cos\theta_e & -\sin\theta_e \\ \sin\theta_e & \cos\theta_e \end{bmatrix} \begin{bmatrix} V_{qsf} \\ V_{dsf} \end{bmatrix} \qquad (7)$$

On one hand, when stator field frequency is less than the instantaneous rotor frequency, angle $\theta_e$ will be at a value which causes feedback voltage $V_{def}$ to be less than commanded d-axis voltage $V_{de}*$. Thus, the difference $V_{de}*-V_{def}$ can be used to increase stator field frequencies. On the other hand, when stator field frequency is greater than the instantaneous rotor frequency, angle $\theta_e$ will be at a value which causes feedback voltage $V_{def}$ to be greater than commanded d-axis voltage $V_{de}*$. Difference $V_{de}*-V_{def}$ in this case is used to decrease stator field frequency.

B. Hardware

Figure 3:
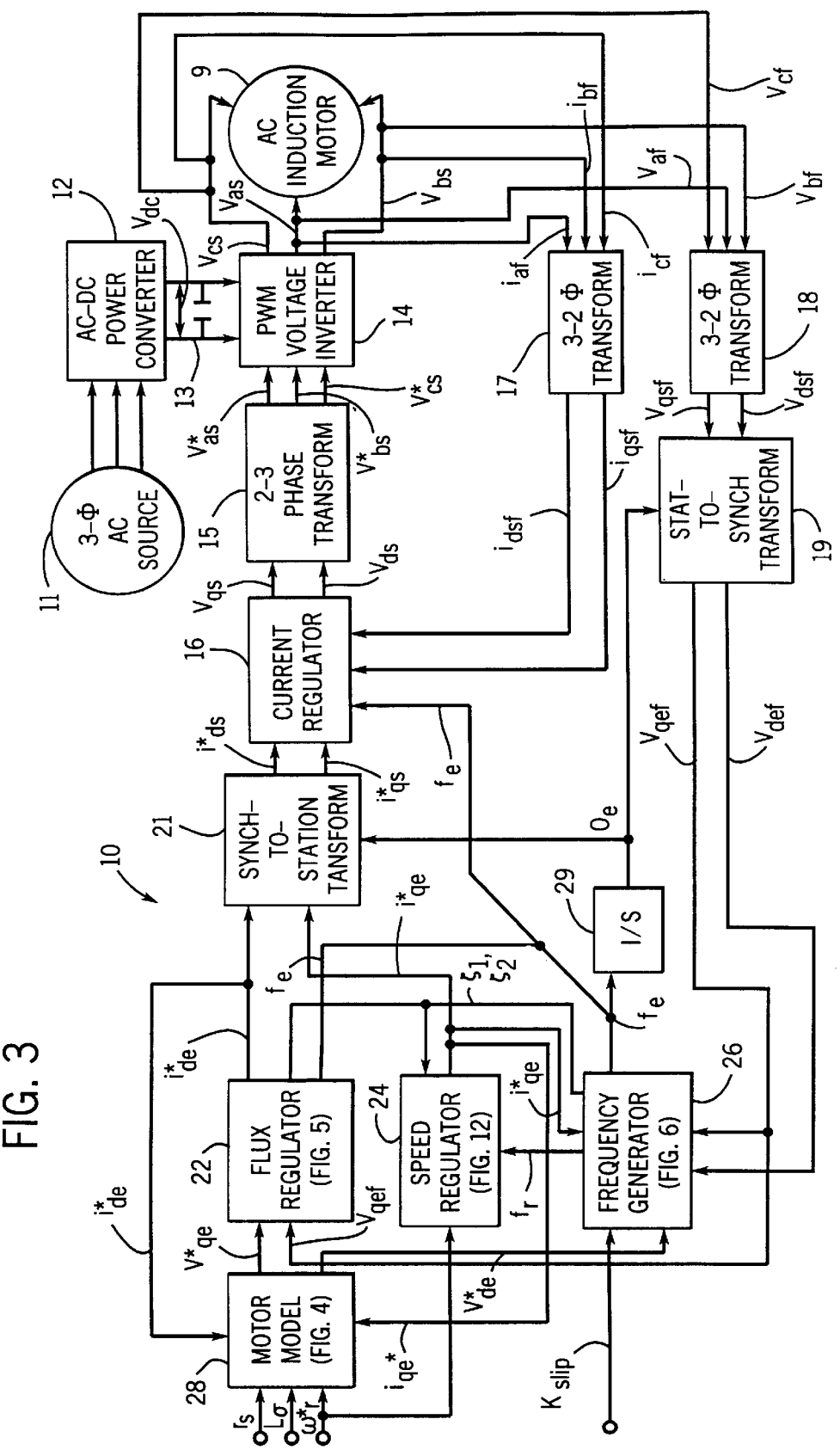
FIG. 3 is a schematic view of a motor controller according to the present invention.

Referring now to FIG. 3, the present invention will be described in the context of an exemplary current regulated pulse width modulated motor controller 10 for an induction motor 9. Generally speaking, induction motor 9 can be characterized by a number of different motor variables including a stator resistance $r_s$ and a transient inductance $L_o$. Controller 10 is provided with a stator resistance value $r_s$ and a transient inductance signal $L_o$ which correspond to motor 9. Generally, controller 10 receives a command rotor frequency signal $\omega_r*$ indicating a desired motor rotor speed and generates three phase voltage signals $V_{as}$, $V_{bs}$ and $V_{cs}$ at three stator terminals which cause three stator currents (not illustrated) which together are intended to drive motor 9 at the commanded rotor frequency $\omega_r*$.

To this end, controller 10 comprises a plurality of components including, among other things, a three-phase AC source 11, a power converter 12, a DC bus 13, a pulse width modulated (PWM) inverter 14, a two-to-three phase transformer 15, a current regulator 16, a three-to-two phase transformer 17, a second three-to-two phase transformer 18, a stationary to synchronous transformer 19, a synchronous-to-stationary transformer 21, a flux regulator 22, a speed regulator 24, a frequency generator 26, a motor model 28 and an integrator 29.

A power conversion section of controller 10 includes source 11, converter 12 and DC bus 13. AC power source 11 provides three-phase AC power at a line frequency of 60 Hz. The three phases of source 11 are connected an AC-DC power converter 12 which rectifies the alternating current from source 11 to produce DC voltage $V_{dc}$ of constant magnitude on bus 13 which connects to power inputs on inverter 14.

Controller 10 includes two separate feedback loops for providing feedback voltage and current signals. The first feedback loop, a current loop, includes three current sensors (e.g. Hall effect sensors, not illustrated), a separate current sensor attached to each of three motor terminals for providing current feedback signals $i_{af}$, $i_{bf}$ and $i_{cf}$ to transformer 17. Transformer 17 converts the three-phase current feedback signals $i_{af}$, $i_{bf}$ and $i_{cf}$ to two-phase signals referenced to a stationary d-q frame of reference in a manner well know in the art providing d and q-axis feedback current signals $i_{dsf}$ and $i_{qsf}$, respectively.

The second feedback loop, a voltage loop, includes three voltage sensors (not illustrated), a separate voltage sensor provided at each of three motor terminals to provide voltage feedback signals $V_{af}$, $V_{bf}$ and $V_{cf}$ to 3-to-2 phase transformer 18. Transformer 18, like transformer 17 converts its three-phase inputs to two-phase d and q-axis stationary voltage signals $V_{dsf}$ and $V_{qsf}$, respectively. Feedback voltages $V_{dsf}$ and $V_{qsf}$ are provided to stationary-to-synchronous transformer 19. In addition, transformer 19 receives phase angle signal $\theta_e$ which is related to the stator field frequency. Transformer 19 uses its received signals to transfer stationary signals $V_{qsf}$ and $V_{dsf}$ to synchronous signals $V_{qef}$ and $V_{def}$ according to Equation 9 above. Signals $V_{qef}$ and $V_{def}$ are provided to other controller 10 components as described in more detail below.

Inverter 14 includes a group of switching elements which are turned on and off to convert DC voltage on bus 13 to pulses of constant magnitude. The pulses formed by inverter 14 are characterized by a first set of positive going pulses of constant magnitude but of varying pulse width followed by a second set of negative going pulses of constant magnitude and varying pulse width. The RMS value of this pulse train pattern approximates one cycle of a sinusoidal AC waveform. The pattern is repeated to generate additional cycles of the AC waveform.

To control the frequency and magnitude of the resultant AC power signals to motor 9, AC inverter control signals are applied to inverter 14. Inverter 14 receives three balanced AC inverter control signals $V_{as}*$, $V_{bs}*$ and $V_{cs}*$ which vary in phase by 120°, and the magnitude and the frequency of these signals determines the pulse widths and the number of pulses in pulse trains $V_{as}$, $V_{bs}$ and $V_{cs}$ which are applied to the motor terminals. Voltages $V_{as}$, $V_{bs}$ and $V_{cs}$ are phase voltage signals incorporated in the line-to-line voltages observed across the stator terminals.

The AC inverter control signals $V_{as}*$, $V_{bs}*$ and $V_{cs}*$ result from a 2-to-3 phase conversion accomplished via transformer 15 in a manner well known in the art. Input signals $V_{qs}$ and $V_{ds}$ are sinusoidal AC voltage command signals having a control signal magnitude and a frequency. These signals are related to the stationary d-q reference frame in which torque controlling electrical parameters are related to the q-axis and flux controlling electrical parameters are related to the d-axis. The q-axis leads the d-axis by 90° in phase difference.

Control signals $V_{qs}$ and $V_{ds}$ are output signals from a synchronous current regulator 16. Details of regulator 16 have been previously shown and described in U.S. Pat. No. 4,680,695 which issued to Kerkman, et al. on Jul. 14, 1987 entitled "Cross Coupled Current Regulator" which is incorporated herein by reference. As described therein, regulator 16 includes a proportional-integral loop (PI loop) with summing inputs. At one summing input, an AC current command signal for the q-axis $i_{qs}*$ is algebraically summed with a q-axis feedback signal $i_{qsf}$ to provide a current error for the q-axis. At a second summing input, an AC current command for the d-axis $i_{ds}*$ is algebraically summed with a d-axis feedback signal $i_{dsf}$ to provide a current error for the d-axis. A stator operating frequency $f_e$ is also input to regulator 16. Frequency $f_e$ is multiplied by $2\pi$ to generate an angular frequency $\omega_e$ in radians. With these input signals regulator 16 controls the AC voltage command signals $V_{qs}$ and $V_{ds}$ at its outputs in response to current error and further, regulator 16 maintains vector orientation of output signals to the d and q-axes.

Referring still to FIG. 3, synchronous-to-stationary transformer 21 receives both d and q-axis synchronous command current signals $i_{de}*$ and $i_{qe}*$ and also receives phase angle $\theta_e$ and converts synchronous command signals $i_{de}*$ and $i_{qe}*$ to stationary signals $i_{ds}*$ and $i_{qs}*$ accordingly. To this end, synchronous command current signal $i_{de}*$ is provided by flux regulator 22 while synchronous command current signal $i_{qe}*$ is provided by speed regulator 24.

Figure 5:
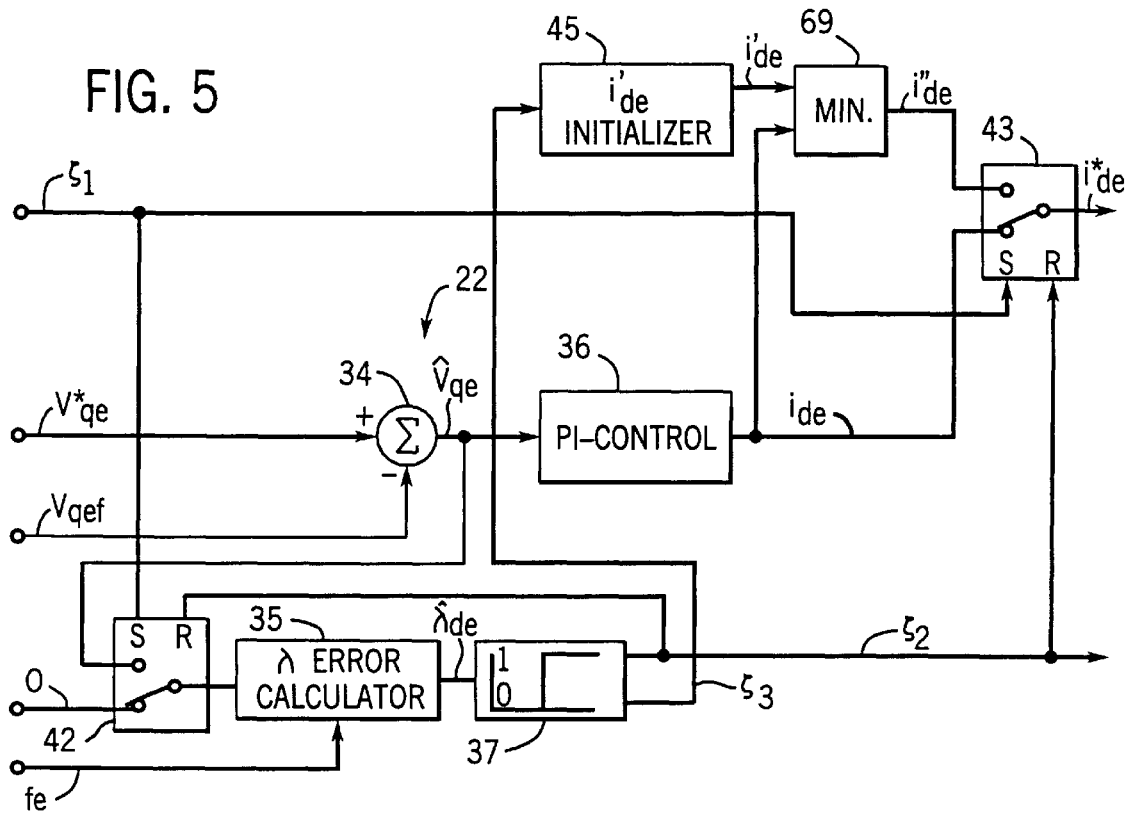
FIG. 5 is a schematic view of the flux regulator of FIG. 3.

Referring still to FIG. 3 and also to FIG. 5, flux regulator 22 includes a summer 34, a PI controller 36, a switch 43, a d-axis search current initializer 45, a minimizer 69, another switch 42, a flux error calculator 35 and a comparator 37.

Regulator 22 receives both q-axis command voltage signal $V_{qe}*$ and feedback voltage signal $V_{qef}$ and uses those signals to generate synchronous d-axis current $i_{de}*$. To this end, summer 34 subtracts feedback voltage $V_{qef}$ from command voltage $V_{qe}*$ generating a q-axis voltage error signal $\hat{V}_{qe}$. Error $\hat{V}_{qe}$ is provided to PI controller 36 which steps up that error thereby generating current signal $i_{de}$. Signal $i_{de}$ and signal $i_{de}'$ from initializer 45 are both provided to minimizer 69 which selects and passes the lowest of the two input signals $i_{de}$ and $i_{de}'$ as a search current $i_{de}"$.

Switch 43 is a single pole, double throw settable/resettable (i.e. once set only changes state when reset and once reset only changes state when set) device having two inputs and a single output. Switch 43 is used to select between two separate input current values, one value being d-axis current $i_{de}$ as provided by controller 36, the other being d-axis search current $i_{de}"$ provided by minimizer 69. Current $i_{de}'$ is typically less than a rated d-axis current and for the purposes of this explanation, it will be assumed current $i_{de}'$ is 1/10th a rated d-axis current value. To select between currents $i_{de}"$ and $i_{de}$, switch 43 includes a first input linked to minimizer 69 and a second linked to a controller 36 and a single output which provides command current $i_{de}*$. Switch 43 also includes both a set input and a reset input R which are linked to flag signals $\zeta_1$ and $\zeta_2$, respectively. Inputs S and R are control inputs. During normal operation the switch 43 output is normally linked to the output of controller 36. However, when flag $\zeta_1$ goes from low to high, switch 43 output switches to the output of minimizer 69 providing the minimum value of $i_{de}"$ and $i_{de}$ as search current. Switch 43 remains so switched until flag signal $\zeta_2$ changes from high to low. Flags $\zeta_1$ and $\zeta_2$ are described in more detail below.

During a frequency searching procedure, flux regulator 22 uses error $\hat{V}_{qe}$ to determine a d-axis flux error $\hat{\lambda}_{de}$ which is then compared to a threshold flux error value $\hat{\lambda}_{th}$. Where the flux error $\hat{\lambda}_{de}$ is greater than the threshold value $\hat{\lambda}_{th}$, stator field frequency is appreciably different than the instantaneous rotor frequency and therefore the search continues. However, when flux error $\hat{\lambda}_{de}$ is less than value $\hat{\lambda}_{th}$, stator field frequency is similar to the rotor frequency and the search has been completed and the motor is "fluxed up".

To this end, switch 42 is a single pole, double throw settable/resettable device having two inputs and a single output. As indicated above, a first input is tied to the output of summer 34 so that the first input receives voltage error $\hat{V}_{qe}$. The second input is tied to a zero value. In addition, switch 42 has both a set input S and a reset input R which are linked to separate flag signals $\zeta_1$ and $\zeta_2$, respectively. Inputs S and R are used to control switch 42 (i.e. control which input is linked to the output) and, after the switch 42 output is linked to one input it remains so linked until a proper flag signal is received as explained.

During normal operation switch 42 output is linked to the zero input. However, when flag signal $\zeta_1$ changes from low to high, switch 42 output switches to the $\hat{V}_{qe}$ input and remains so switched until flag signal $\zeta_2$ changes from high to low.

The output of switch 42 is provided to flux error calculator 35 which also receives stator field frequency $f_e$ from switch 64. When voltage error $\hat{V}_{qe}$ is received by calculator 35, calculator 35 multiplies frequency $f_e$ by $2\pi$ generating frequency $\omega_e$ and then solves Equation 6a to determine flux error $\hat{\lambda}_{de}$. Flux error $\hat{\lambda}_{de}$ is provided to comparator 37 which compares error $\hat{\lambda}_{de}$ to the threshold error value $\hat{\lambda}_{th}$. Where error $\hat{\lambda}_{de}$ is less than value $\hat{\lambda}_{th}$, comparator 37 generates a low signal $\zeta_2$ Where error $\hat{\lambda}_{de}$ is greater than value $\hat{\lambda}_{th}$, comparator 37 generates a high signal $\zeta_2$. Flag signal $\zeta_2$ is provided to both switches 42 and 43 for control purposes. When signal $\zeta_2$ goes high, switch 43 remains linked to minimizer 69, providing current $i_{de}"$ as command current $i_{de}*$ and switch 42 remains linked to the output of summer 34. When signal $\zeta_2$ goes from high to low, both switches 42 and 43 switch so that switch 42 links the zero input to its output and switch 43 provides current $i_{de}$ as command current $i_{de}*$.

Figure 12:
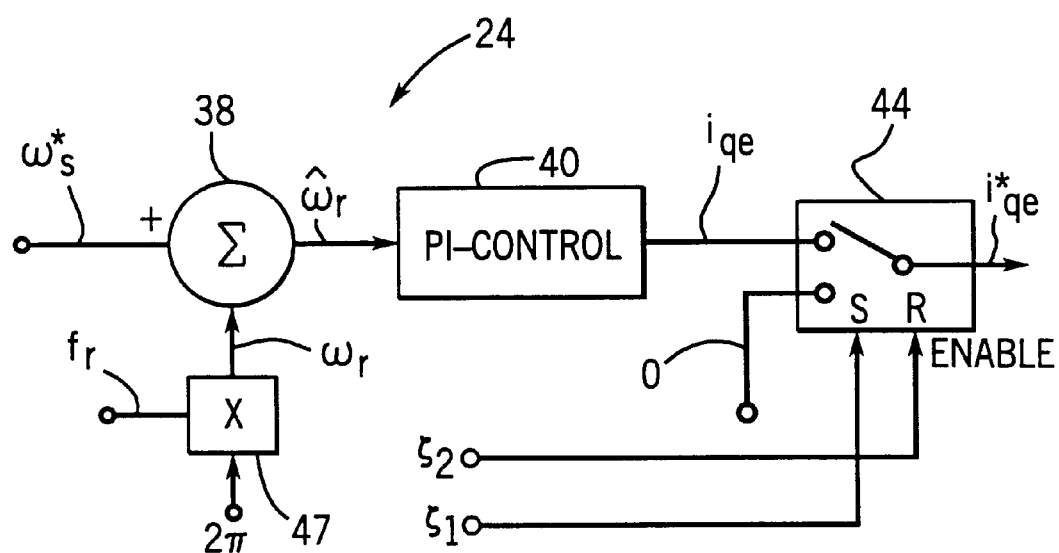
FIG. 12 is a schematic of the speed regulator of FIG. 3.

Referring to FIGS. 3 and 12, speed regulator 24 includes a summer 38, a PI controller 40, a switch 44 and a multiplier 47. Regulator 24 receives command rotor frequency signal $\omega_r*$ in radians, an estimated rotor frequency signal $f_r$ and flag signals $\zeta_1$ and $\zeta_2$ and uses those signals to generate synchronous q-axis command current $i_{qe}*$ which is provided to transformer 21. To this end, multiplier 47 multiplies signal $f_r$ by $2\pi$ to generate frequency $\omega_r$ in radians. Summer 38 subtracts speed estimate $\omega_r$ from rotor command frequency $\omega_r*$ generating a speed error signal $\hat{\omega}_r$ which is provided to controller 40. Controller 40 steps up error signal $\hat{\omega}_r$ thereby generating synchronous q-axis current $i_{qe}$ which is provided as one input to switch 44. A second input to switch 44 is linked to a zero value. Switch 44 is similar to switch 43 in that it is a settable/resettable switch having two command inputs S and R. Input S is linked to receive flag signal $\zeta_1$ while input R is linked to receive flag $\zeta_2$. Normally switch 44 links current $i_{qe}$ to the switch 44 output. When signal $\zeta_2$ changes from low to high switch 44 is switched so that the zero input is linked to the switch 44 output. In this case q-axis command current $i_{qe}^*$ is zero. Switch 44 output remains linked to the zero input until signal $\zeta_2$ changes from high to low indicating a relatively small d-axis flux error $\hat{\lambda}_{de}$. Flag signal $\zeta_2$ controls switch 44 such that when flag $\zeta_2$ is high switch 44 links its output to the zero input and when flag $\zeta_2$ is low switch 44 links its output to the output of controller 40 thereby providing current signal $i_{qe}$ as command signal $i_{qe}^*$.

Figure 4:
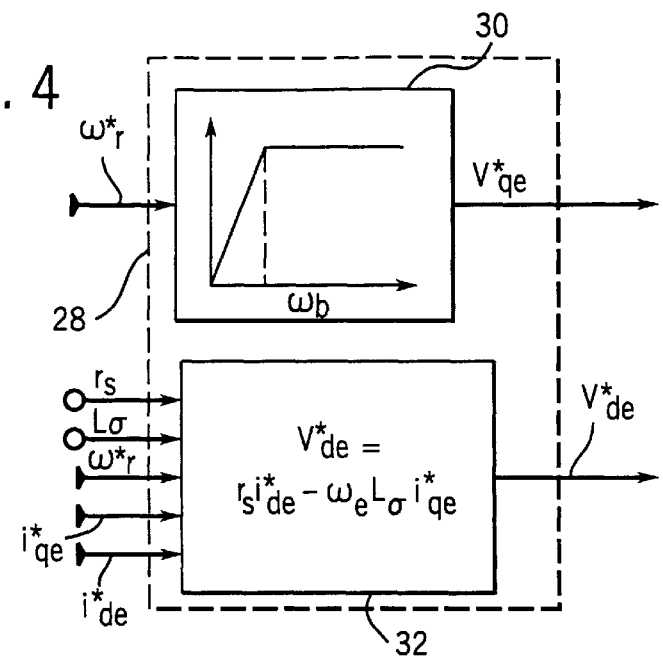
FIG. 4 is a schematic view of the motor model of FIG. 3.

Referring to FIGS. 3 and 4, motor model 28 receives stator resistance value $r_s$, transient inductance value $L_\sigma$, rotor command frequency signal $\omega_r^*$ and both the d and q-axis command current signals $i_{de}^*$ and $i_{qe}^*$, respectively, and uses those signals to generate both q-axis command voltage signal $V_{qe}^*$ and d-axis command voltage signal $V_{de}^*$. To this end, model 28 includes a function block 30 and calculator 32. Block 30 represents calculation of the q-axis voltage command $V_{qe}^*$ according to Equations 1 and 4 above. Similarly, calculator 32 solves the following equation (i.e. Equations 2 and 3 combined) to provide command voltage $V_{de}^*$:

$$V_{de}^* = r_s i_{de}^* - \omega_e L_\sigma i_{qe}^* \qquad (8)$$

Figure 6:
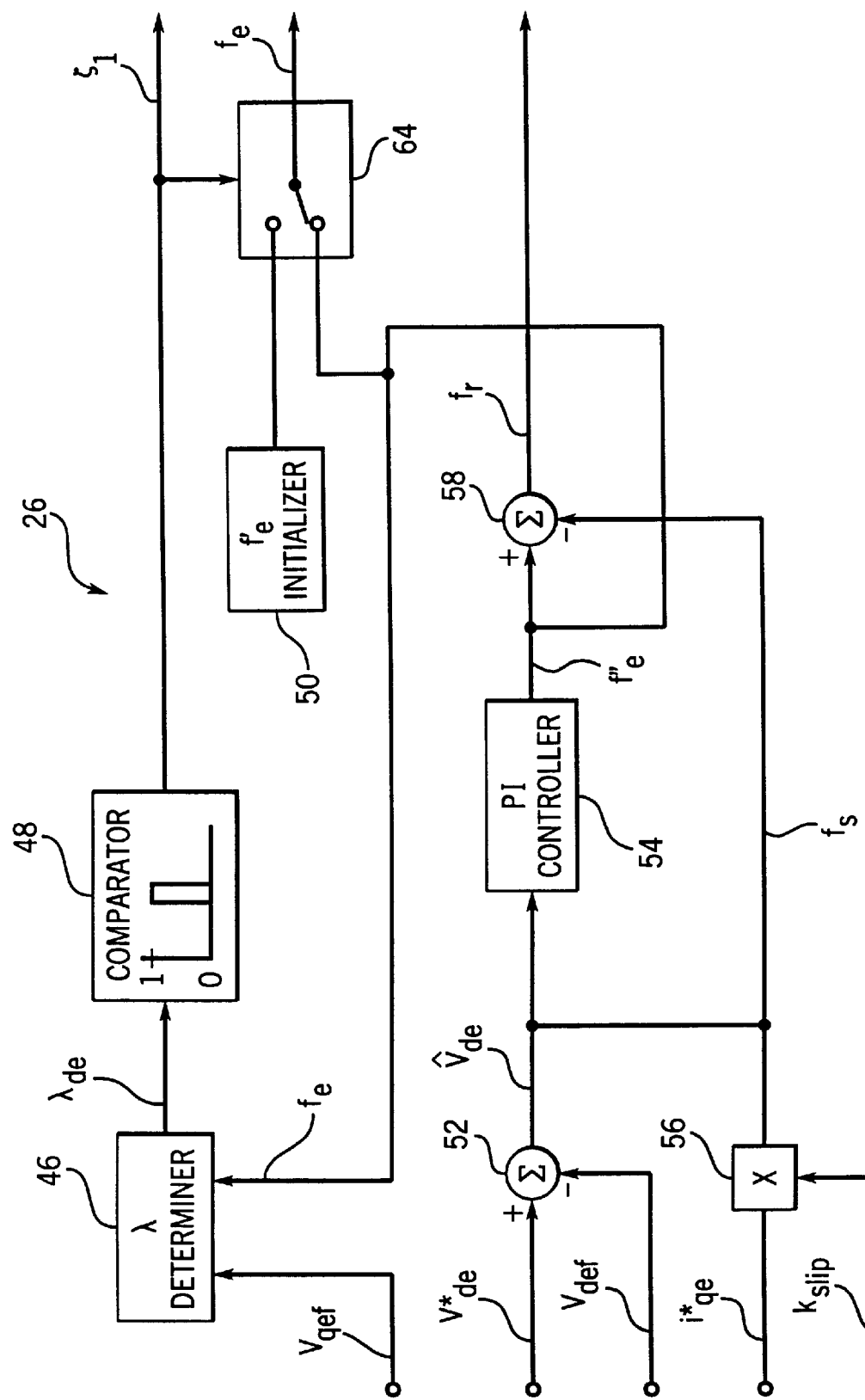
FIG. 6 is a schematic view of the frequency generator of FIG. 3.

Referring to FIGS. 3 and 6, frequency generator 26 includes a flux determiner 46, a comparator 48, a frequency initializer 50, a summer 52, a PI controller 54, one multiplier 56, another summer 58, a first switch 64 and a second switch 42, a flux error calculator 35 and a second comparator 37. Generator 26 receives a plurality of signals including q-axis feedback voltage $V_{qef}$, d-axis command voltage $V_{de}^*$, d-axis feedback voltage $V_{def}$ command current signals $i_{qe}^*$ and a slip value $k_{slip}$ indicating a desired stator field/rotor slip and uses those signals to generate frequency signals $f_e$ and $f_r$ and flag signals $\zeta_1$, $\zeta_2$ and $\zeta_3$.

Determiner 46 and comparator 48 cooperate to generate flag signal $\zeta_1$. To this end, determiner 46 receives both q-axis feedback voltage $V_{qef}$ and frequency signal $f_e$, multiplies signal $f_e$ by $2\pi$ to generate frequency $\omega_e$ in radians and then solves the following equation to identify instantaneous residual d-axis stator flux $\lambda_{de}$:

$$\lambda_{de} = \frac{V_{qef}}{\omega_e} \qquad (9)$$

Flux $\lambda_{de}$ is provided to comparator 48. Comparator 48 compares flux $\lambda_{de}$ to threshold flux $\lambda_{th}$. Where flux $\lambda_{de}$ is greater than threshold flux $\lambda_{th}$, comparator 48 generates a low flag signal $\zeta_1$. However, where flux $\lambda_{de}$ is less than or equal to threshold flux $\lambda_{th}$, comparator 48 generates a high flag signal $\zeta_1$ for a short trigger period. Signal $\zeta_1$ remains high for only a very short time and thereafter goes low again until flux $\lambda_{de}$ again dips below threshold flux $\lambda_{th}$. Signal $\zeta_1$ is provided to switches 42 and 64 and, as described above, is also provided to switch 43 in flux regulator 22 and to switch 44 in regulator 24.

Flag signal $\zeta_1$ is related to the amount of residual stator flux which exists during the first stage of a deceleration period when motor power is initially cut off. Flag signal $\zeta_1$ is low when the residual stator flux is sufficient for tracking rotor frequency and goes high for a short trigger period when the residual stator flux initially becomes insufficient for tracking rotor frequency. How signal $\zeta_1$ is generated is described in more detail below.

Referring still to FIG. 6, summer 52 subtracts feedback voltage $V_{def}$ from command signal $V_{de}^*$ to produce a d-axis voltage error $\hat{V}_{de}$ which is provided to controller 54. Controller 54 steps up the error, thereby generating frequency signal $f_e''$.

Multiplier 56 multiplies command current signal $i_{qe}^*$ by slip signal $k_{slip}$ to generate a slip frequency $f_s$. Summer 58 subtracts slip frequency $f_s$ from frequency $f_e''$ to generate estimated rotor frequency $f_r$ which is provided as an output used by regulator 24 (see FIG. 12).

Switch 64 includes two inputs, a first input linked to initializer 50 for receiving an initial search frequency $f_e'$ and a second input linked to the output of controller 54 for receiving frequency $f_e''$, and a single output providing frequency signal $f_e$. Search frequency $f_e'$ is chosen to be a typical rotor frequency when a drive is restarted into a rotating motor. For example, where a typical commanded rotor frequency is 30 Hz and a motor will usually slow down after motor power is cut off, search frequency $f_e'$ may be 28 Hz. In the alternative, frequency $f_e'$ may be the last known/tracked rotor frequency. Yet another choice is to provide an extremely high search frequency, say 120 Hz and always lower the search frequency during a frequency search procedure. Flag signal $\zeta_1$ controls switch 64. When flag $\zeta_1$ is low indicating sufficient residual stator flux to track rotor speed, frequency $f_e''$ is provided as signal $f_e$. When signal $\zeta_1$ changes from low to high, switch 64 links the output of initializer 50 to the switch 64 output and initializes the PI control 54.

Referring still to FIG. 3, frequency signal $f_e$ is provided to integrator 29, regulator 16 and flux regulator 22. Integrator 29 integrates frequency signal $f_e$ providing phase angle signal $\theta_e$ for use by transformers 19 and 21 as described above.

V. Operation

In operation, referring also to FIG. 3, assuming drive 10 is enabled so that power is provided to motor 9 and the motor rotor is rotating at a rotor frequency $\omega_r$ which is equal to the commanded rotor frequency $\omega_r^*$ which is 30 Hz, controller 10 operates to maintain motor rotor frequency at the commanded frequency $\omega_r^*$ through conventional FOC strategies.

When power is cut off to motor 9, in most situations, rotor friction and windage cooperate to begin to slow the motor rotor from its commanded frequency (i.e. 30 Hz) toward a zero speed. Although unusual, in some cases, when motor power is cut off, the rotor may actually speed up. For example, if the motor drives a fan and wind tends to drive the fan at a higher frequency than the drive, the fan blade and hence rotor may increase in speed when motor power is cut off. Despite this possibility, in the interest of simplifying this explanation it will be assumed that when power is cut off the rotor tends to slow down.

Figure 7:
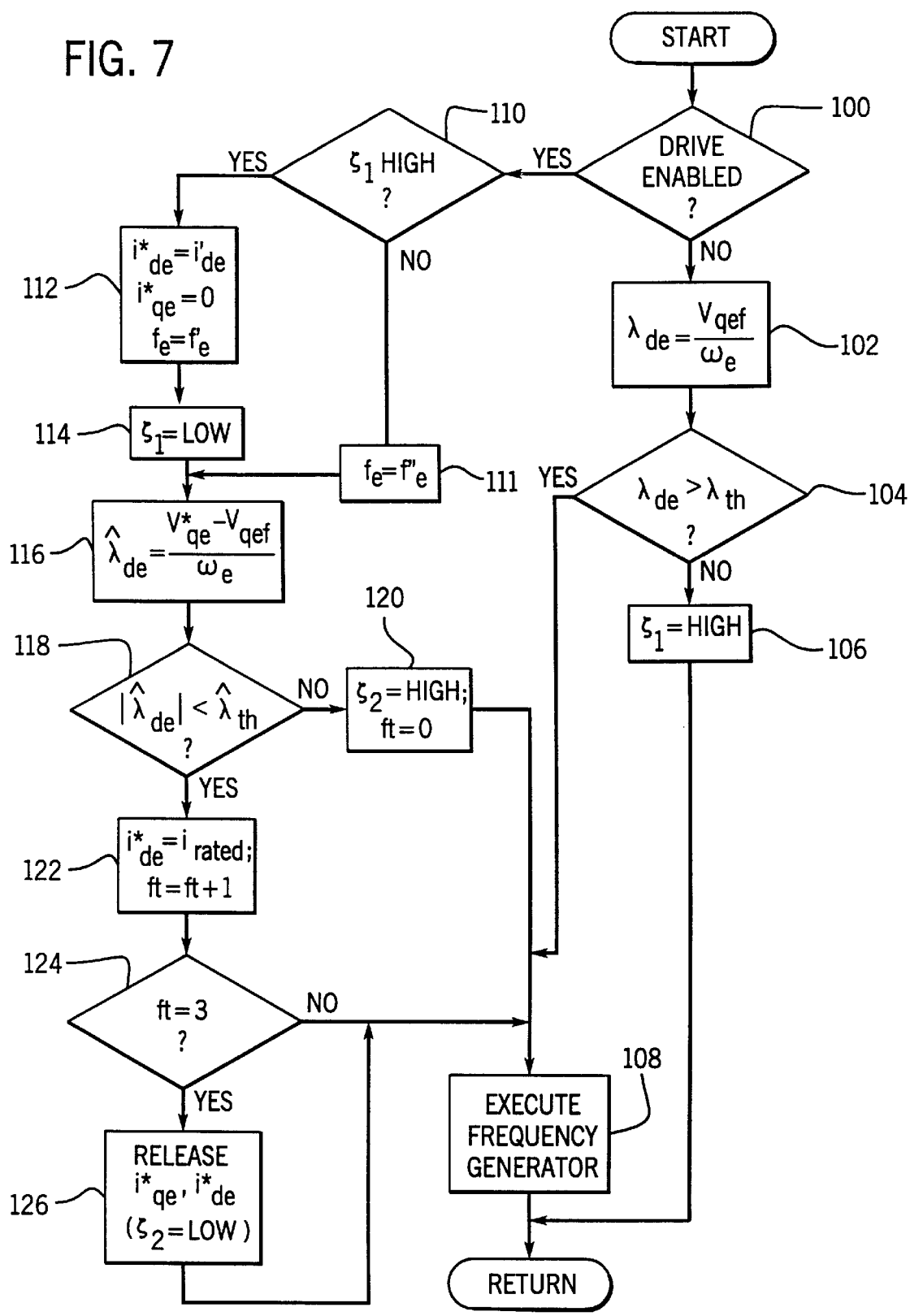
FIG. 7 is a flow chart illustrating a preferred method according to the present invention.

Referring also to FIG. 7, a process for determining rotor frequency after motor power is cut off is illustrated. At block 100, when drive 10 is disabled meaning that power to motor 9 is cut off, control passes to block 102. Initially, because of rotor inductance, some current continues to flow through the rotor bars thereby causing a rotor flux. The rotor flux in turn causes stator winding flux $\lambda_{de}$ which is reflected in q-axis feedback voltage. If the stator flux $\lambda_{de}$ is of a sufficiently high value, the frequency generator 109 (see block 26 of FIG. 6) can be used to track rotor speed. Referring to FIGS. 6 and 7, at block 102, determiner 46 uses q-axis feedback voltage $V_{qef}$ and frequency signal $f_e$ to determine stator flux $\lambda_{de}$ which is provided to comparator 48. At block 104 comparator 48 determines whether or not flux $\lambda_{de}$ is greater than or less than threshold flux $\lambda_{th}$ which is required for tracking rotor speed. At block 106, comparator 48 provides a high flag signal $\zeta_1$ when flux $\lambda_{de}$ is insufficient for rotor frequency tracking.

Referring to FIGS. 5, 6, 7 and 12, flag signal $\zeta_1$ is provided to switches 42, 43, 44 and 64. When flag signal $\zeta_1$ is low, switch 42 is linked to its zero input, switch 43 is linked to controller 36 output providing current $i_{de}$, switch 44 is linked to controller 40 providing current $i_{qe}$ and switch 64 is linked to the output of summer 58 so that controller 10 operates in a normal fashion to track rotor speed via residual stator flux reflected in feedback voltage $V_{def}$. However, when signal $\zeta_1$ goes high the inventive frequency searching procedure begins.

To this end, when signal $\zeta_1$ goes high indicating that residual stator flux is too low to be used for rotor frequency tracking, control passes through decision block 110 to block 112 where switch 64 instantaneously switches providing initial search frequency $f_e'$ as signal $f_e$. Signal $\zeta_1$ remains high for only a short trigger period so that frequency $f_e'$ is only provided for a short period to start a frequency search after which time other controller components update frequency signal $f_e$ to reflect frequency adjustments performed to identify the rotor frequency. In addition, when signal $\zeta_1$ goes high, switch 42 provides voltage error $\hat{V}_{qe}$ to calculator 35, switch 43 provides search current $i_{de}"$ as commanded current $i_{de}*$ and switch 44 sets commanded current $i_{qe}*$ equal to zero. Preferably, search current $i_{de}"$ is much less (e.g. 1/10th) than a rated current value and as explained in more detail below, is stepped up to the rated value only after the frequency search is complete.

At block 114 signal $\zeta_1$ is again forced low and remains low until the next time drive 10 is disabled and flux $\lambda_{de}$ dips below threshold flux $\lambda_{th}$. The next time control passes through decision block 110, because flag signal $\zeta_1$ is low, control will pass through block 111 so that switch 64 provides signal $f_e"$ from controller 54 at its output.

At block 116 calculator 35 receives error $\hat{V}_{qe}$ from summer 34 and qe frequency signal $f_e$ and generates flux error $\hat{\lambda}_{de}$ which is provided to comparator 37. At block 118 comparator 37 compares flux error $\hat{\lambda}_{qe}$ to threshold error $\hat{\lambda}_{th}$ and at block 120 generates high flag signal $\zeta_2$ when flux error $\hat{\lambda}_{de}$ is greater than threshold error $\hat{\lambda}_{th}$, signal $\zeta_2$ remaining high until flux error $\hat{\lambda}_{de}$ is less than threshold error $\hat{\lambda}_{th}$. In addition, at block 120, a flux up counter ft is initially set to a zero value. Counter ft is used to, after d-axis current $i_{de}*$ is increased to a rated value, allow rotor flux to increase before releasing torque producing command current $i_{qe}*$.

Next, control passes to block 108 where the frequency search continues via modification of frequency $f_e"$ by generator 26 (see FIG. 6) based on the d-axis voltage error $\hat{V}_{de}$. Eventually as stator field frequency $f_e$ (i.e. see $f_e"$) approaches the rotor frequency, flux error $\hat{\lambda}_{de}$ will be less than threshold error $\hat{\lambda}_{th}$ at block 118. When this occurs control passes to block 112 where d-axis command current $i_{de}*$ is increased to a rated d-axis current value $i_{rated}$. In addition, counter ft is increased by one at block 122.

Next, a delay is provided prior to releasing the torque generating q-axis command current $i_{qe}*$. This delay is provided to allow rotor flux to increase as rotor flux does not change instantaneously when rotor current is increased to the rated value. To this end, at block 124 counter ft is compared to a value which reflects a suitable flux-up period. In the present example, it is assumed that a suitable flux-up time corresponds to three cycles through the process of FIG. 7, hence, counter ft is compared to the number 3 at block 124. Where counter ft is less than 3, control passes to block 128. When counter ft equals 3, control passes to block 126 where signal $\zeta_2$ is set low thereby causing switch 42 to link its output to the zero input, causing switch 43 to link its output to controller 36 and causing switch 44 to link its output to controller 40, thus releasing both the q-axis command current $i_{qe}*$ and the d-axis command current $i_{de}*$ and allowing normal FOC operation. The next time the drive is disabled and re-enabled, counter ft is reset to a zero value at block 120 to facilitate another flux-up delay period.

Thus, during frequency searching, $i_{qe}*$ is held at a zero level while $i_{de}*$ is held at the specified initial search current level and the only variable modified by controller 10 is frequency $f_e$. As frequency $f_e$ is modified and approaches the instantaneous rotor frequency, the q-axis flux error as reflected by voltage error $\hat{V}_{de}$ (see FIG. 6) is reduced. When frequency $f_e$ is near the rotor frequency voltage error $\hat{V}_{qe}$ becomes small enough that flux error $\hat{\lambda}_{de}$ is less than the threshold error value $\hat{\lambda}_{th}$. At this point comparator 37 is programmed to generate a third flag signal $\zeta_3$ provided to initializer 45 indicating that flux error $\hat{\lambda}_{de}$ is below threshold value $\hat{\lambda}_{th}$. When signal $\zeta_3$ is received, initializer 45 immediately increases search current $i_{de}*$ to rated d-axis current $i_{rated}$ and rotor flux is increased accordingly. When signal $\zeta_3$ is provided, comparator 37 counts out a "flux up" period prior to forcing signal $\zeta_2$ from high to low. After the flux-up period, comparator 37 causes signal $\zeta_2$ to go low thereby providing currents $i_{qe}$ and $i_{de}$ as command currents $i_{qe}*$ and $i_{de}*$, respectively, via switches 44 and 43, respectively.

VI. Results

Prototype software was developed in order to test the inventive method of starting a drive into a rotating motor with reduced current. Tests were performed at various horse power levels. Results presented in FIGS. 8 through 12 were obtained using a 460 volt, 532 Arms F frame inverter and a Marathon 500 HP, 504 Arms, 1785 RPM motor. The motor was mechanically decoupled from a load.

Figure 8:
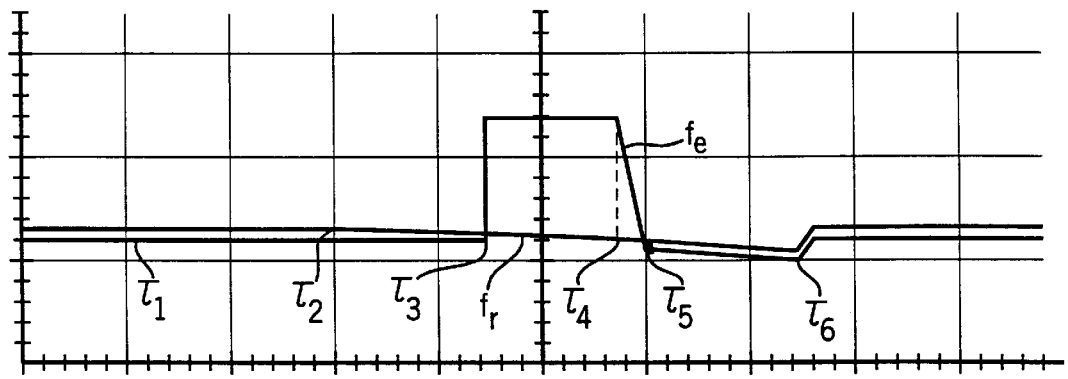
FIG. 8 is a graph illustrating stator field search frequency and actual rotor velocity during a frequency search procedure according to the present invention.
Figure 9:
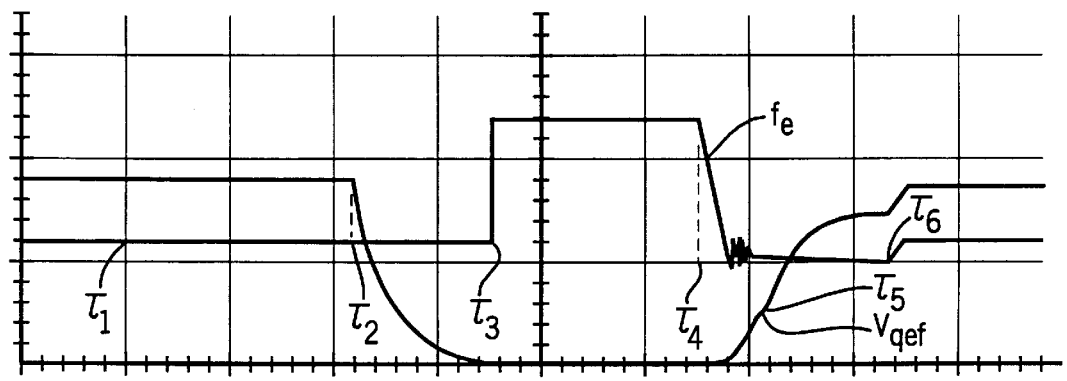
FIG. 9 is a graph illustrating q-axis feedback voltage stator field frequency during a frequency search according to the present invention.
Figure 10:
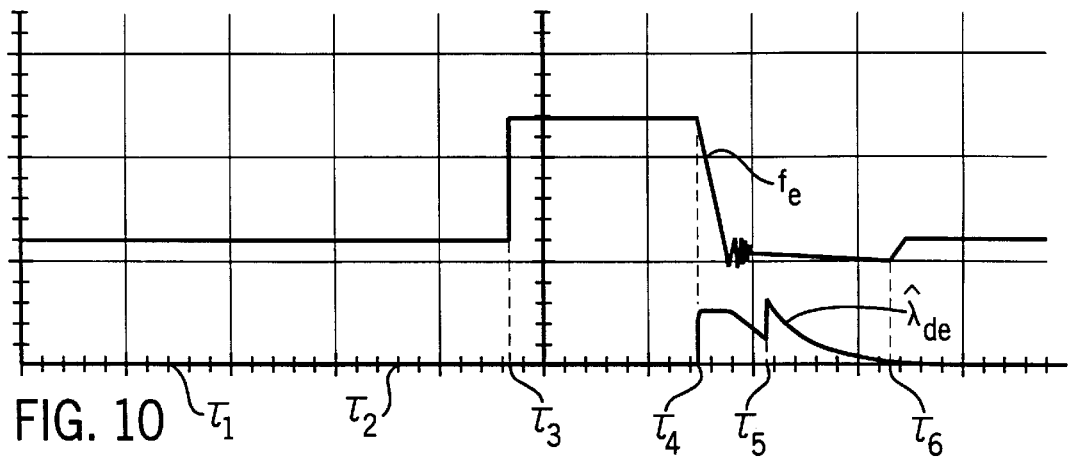
FIG. 10 is a graph illustrating flux error and stator field frequency during a frequency search according to the present invention.
Figure 11:
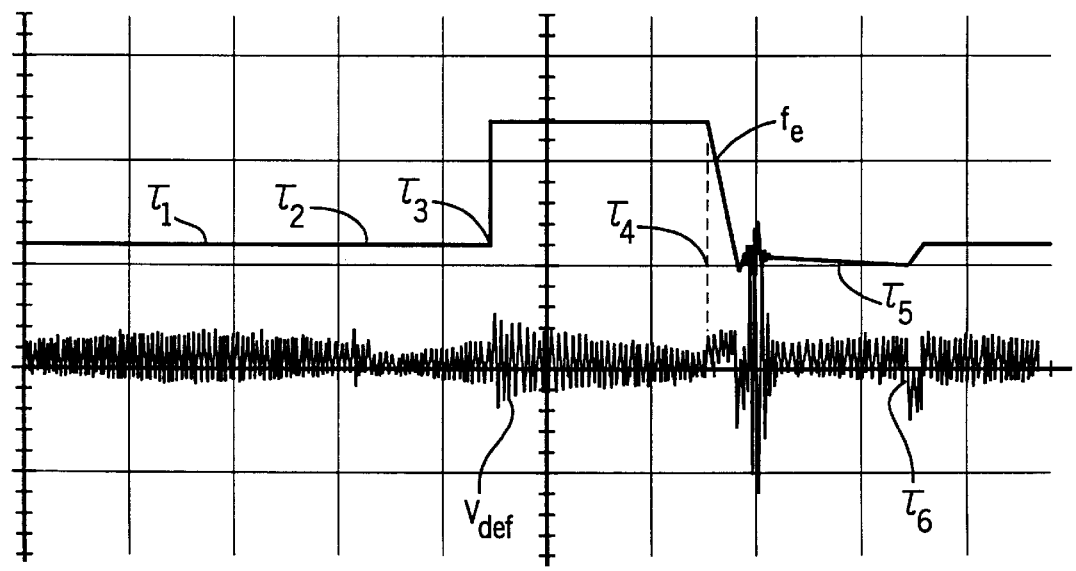
FIG. 11 is a graph illustrating d-axis feedback voltage and stator field frequency during a frequency search according to the present invention.

Referring specifically to FIG. 8, two separate curves are illustrated including an actual rotor velocity curve $f_r$ and a stator field drive frequency $f_e$. In FIG. 9, a drive frequency curve $f_e$ is again illustrated. In addition, a q-axis feedback voltage $V_{qef}$ is illustrated. In FIG. 10, drive frequency $f_e$ is again illustrated along with a flux error signal $\hat{\lambda}_{de}$. In FIG. 11, drive frequency curve $f_e$ is again illustrated along with d-axis feedback voltage signal $V_{def}$. In FIGS. 8–11, at time $\tau_1$, the motor is driven by the drive at an operating frequency of 30 Hz with no load. At time $\tau_2$ the drive is disabled and rotor speed is tracked using the residual stator flux as reflected in q-axis feedback voltage $V_{qef}$ (see FIG. 9). As seen in FIG. 8, rotor speed $f_r$ slows slightly between times $\tau_2$ and $\tau_6$. At time $\tau_3$, the residual stator flux (reflected in $V_{qef}$) dips below the threshold flux level required for tracking rotor frequency and a search frequency of 60 Hz is initiated. At time $\tau_4$ the drive is enabled again and a frequency search begins. At time $\tau_5$ flux error $\hat{\lambda}_{de}$ is small indicating that the drive frequency is approximately at rotor frequency $f_r$. Between times $\tau_5$ and $\tau_6$, the flux up period is allowed to occur and at time $\tau_6$ the torque command $i_{qe}$ is released so that the drive accelerates the rotor back up to the commanded 30 Hz speed.

It should be understood that the methods and apparatuses described above are only exemplary and do not limit the scope of the invention, and that various modifications could be made by those skilled in the art that would fall under the scope of the invention. For example, while the present invention is described as one wherein a flux error is used to determine rotor speed, clearly, other feedback signals indicative of flux error could be used. For example, because the d-axis voltage error signal $\hat{V}_{de}$ is indicative of flux error, the d-axis error signal $\hat{V}_{de}$ could be compared to a threshold d-axis voltage error signal which corresponds to the threshold flux error signal $\lambda_{th}$. In the alternative, other feedback signals could be used to track rotor frequency. For example, referring to Equation 1, instead of generating $f_e$ using the d-axis voltages $V_{de}*$ and $V_{def}$, a q-axis voltage $V_{qe}*$ and feedback $V_{qef}$ could be used to generate $f_e$. Then, a q-axis flux error $\hat{\lambda}_{qe}$ could be identified by solving a permutation of Equation 3. As above, frequency $\omega_e$ could be modified until flux error $\hat{\lambda}_{qe}$ is essentially zero at which point the q-axis current frequency would be similar to the rotor frequency and normal operation could commence.

In addition, while the preferred embodiment uses a search current $i_{de}'$ which is a small fraction (i.e. ⅒th) of a rated current $i_{rated}$, clearly, the invention could be practiced wherein the rated current is used as the search current. In this case, the flux-up counter ft would not be needed and, once the q-axis flux error is less than the threshold error value, the q-axis torque generating current $i_{qe}*$ could be released.

In the alternative, in this case, after flux error $\hat{\lambda}_{qe}$ is essentially zero indicating that frequency $\omega_e$ is near the rotor frequency, referring again to Equation 4, a d-axis flux $\lambda_{de}$ will be caused by d-axis current $i_{de}*$. Ideally, q-axis current is not released until d-axis flux $\lambda_{de}$ reaches a steady state. Referring also to Equation 2, q-axis flux $\hat{\lambda}_{qe}$ is related to a d-axis voltage $V_{de}$. Therefore, a feedback d-axis voltage $V_{def}$ can be monitored and compared to a d-axis voltage $V_{de}$ which should occur when q-axis flux $\lambda_{qe}$ reaches a steady state. Voltage $V_{de}$ is assumed to be a known value. Once voltage $V_{de}$ is reached, current $i_{qe}"$ can be released without the motor being "fluxed up".

Moreover, the search frequency initializer 50 (see FIG. 6) could be programmable so that it stores the last known rotor frequency for use as the initial search frequency $f_e'$ during frequency searching. In the alternative, initial search frequency $f_e'$ may be selectable by a drive operator.

Furthermore, in some applications where rapid resumption of commanded speed is required, after the rotor speed has been determined, instead of waiting for flux build up before causing normal FOC (i.e. releasing both d and q-axis currents), FOC may be instantaneous so that as flux builds up torque is applied to the rotor. Referring to FIG. 5, this fast start method can be implemented simply by setting flag $\zeta_3$ equal to flag $\zeta_2$.

To apprise the public of the scope of this invention, we make the following claims:

We claim:

1. A method for use with a field oriented controller (FOC) which separately regulates d-axis flux generating current and q-axis torque generating current, the method for starting an AC motor drive into a rotating motor, the method comprising the steps of:

(a) determining an initial search frequency;

(b) determining an initial d-axis flux generating search current;

(c) providing the search current to the motor at the search frequency;

(d) identifying an error indicative of a q-axis flux error;

(e) comparing the error to a maximum error;

(f) where the error is greater than the maximum error, modifying the search frequency and skipping back to step (c);

(g) setting the instantaneous frequency to the instantaneous search frequency; and (h) facilitating normal drive operation wherein both d-axis flux generating current and q-axis torque generating current are provided to the motor at the instantaneous frequency.

2. The method of claim 1 wherein the error is a q-axis flux error.

3. The method of claim 2 wherein the flux error $\hat{\lambda}_{de}$ is determined according to the following equation:

$$\hat{\lambda}_{qe} = \frac{V_{de}^* - V_{def}}{\omega_e}$$

wherein $V_{de}*$ is a commanded d-axis voltage, $V_{def}$ is a feedback d-axis voltage and $\omega_e$ is a stator field frequency in radians.

4. The method of claim 1 wherein the motor causes a residual rotor flux for a decay period after the drive is disabled, the rotor flux indicative of motor velocity and the step of determining the search frequency includes, during the decay period, monitoring the rotor flux and determining motor frequency therefrom.

5. The method of claim 4 wherein the step of determining the search frequency further includes comparing the rotor flux to a minimum rotor flux threshold and, when the rotor flux is less than the minimum rotor flux threshold, selecting a predetermined search frequency as the search frequency.

6. The method of claim 5 for use with a controller wherein a controller operator may specify a typical initial search frequency and the controller also stores the last known drive frequency and the step of selecting a predetermined search frequency includes the steps of:

determining if the operator has specified a typical initial search frequency;

where the operator has specified a typical initial search frequency, using the typical initial search frequency as the search frequency; and where the operator has not specified a typical initial search frequency, using the last known drive frequency as the search frequency.

7. The method of claim 1 wherein the step of determining the initial q-axis flux includes setting the search current equal to a rated d-axis flux generating current.

8. The method of claim 1 for use with a controller including a voltage sensor for providing a d-axis feedback voltage signal and wherein the step of identifying an error includes the steps of identifying a d-axis reference voltage and mathematically combining the d-axis reference voltage and the d-axis feedback voltage.

9. The method of claim 1 wherein the step of determining a search current includes the step of specifying a search current which is less than a rated current.

10. The method of claim 9 wherein, after the error is less than the maximum error, the method further includes the steps of:

increasing the search current to the rated current; and delaying step (g) for a flux-up period during which the d-axis flux increases to essentially a rated flux value.

11. The method of claim 1 wherein the instantaneous search frequency is initially set to be a highest possible rotor frequency and the step of modifying includes reducing the search frequency by a fraction of the instantaneous frequency.

12. The method of claim 1 wherein the controller provides both d-axis command and feedback voltage signals and the step of modifying includes modifying the search frequency as a function of the d-axis voltage signals.

13. An apparatus for use with a field oriented controller (FOC) which separately regulates d-axis flux generating current and q-axis torque generating current, the apparatus for starting an AC motor drive into a rotating motor, the apparatus comprising:

a frequency identifier for determining an initial search frequency;

a current identifier for determining an initial d-axis flux generating search current;

a controller for providing the search current to the motor at the search frequency;

an error determiner for identifying an error indicative of a q-axis flux error; and a comparator for comparing the error to a maximum error;

wherein, when the error is greater than the maximum error, the controller modifies the search frequency and, after the flux error is less than the maximum error, the controller sets the instantaneous frequency to the instantaneous search frequency and causes normal drive operation wherein both d-axis flux generating current and q-axis torque generating current are provided to the motor at the instantaneous frequency.

14. The apparatus of claim 13 wherein the error is a q-axis flux error.

15. The apparatus of claim 14 wherein the motor causes a residual rotor flux for a decay period after the drive is disabled, the rotor flux indicative of motor velocity and the frequency identifier identifies the search frequency by monitoring the rotor flux and determining motor frequency therefrom.

16. The apparatus of claim 15 wherein the comparator is a first comparator, the frequency identifier includes a second comparator which compares the rotor flux to a minimum rotor flux threshold and, the frequency identifier further determines the search frequency by, when the rotor flux is less than the minimum rotor flux threshold, selecting a predetermined search frequency as the search frequency.

17. The apparatus of claim 16 for use with a controller wherein a controller operator may specify a typical initial search frequency and the controller also stores the last known drive frequency and the frequency identifier further determines the initial search frequency by determining if the operator has specified a typical initial search frequency, where the operator has specified a typical initial search frequency, using the typical initial search frequency as the search frequency; and where the operator has not specified a typical initial search frequency, using the last known drive frequency as the search frequency.

18. The apparatus of claim 14 wherein the current identifier sets the initial d-axis flux generating search current equal to a rated d-axis flux generating current.

19. The apparatus of claim 14 for use with a controller including a voltage sensor for providing a d-axis feedback voltage signal and wherein the flux error determiner identifies a d-axis reference voltage and mathematically combining the d-axis reference voltage and the d-axis feedback voltage to determine the flux error.

20. The apparatus of claim 13 wherein the search current identifier determines a search current by specifying a search current which is less than the rated current.

21. The apparatus of claim 20 wherein, after the flux error is less than the maximum flux error, the controller further increases the search current to a rated current value, maintains only the d-axis current for a flux-up period during which the d-axis flux increases to a rated flux value and then provides both d and q-axis currents.

22. A method for use with a field oriented controller (FOC) which separately regulates d-axis flux generating current and q-axis torque generating current, the method for starting an AC motor drive into a rotating motor, the method comprising the steps of:

(a) determining an initial search frequency;

(b) determining an initial q-axis flux generating search current;

(c) providing the search current to the motor at the search frequency;

(d) identifying an error indicative of a d-axis flux error;

(e) comparing the error to a maximum error;

(f) where the error is greater than the maximum error, modifying the search frequency and skipping back to step (c);

(g) setting the instantaneous frequency to the instantaneous search frequency; and (h) facilitating normal drive operation wherein both d-axis flux generating current and q-axis torque generating current are provided to the motor at the instantaneous frequency.

* * * * *